United States Patent
Montemerlo (10) Patent No.: US 11,080,267 B2
(45) Date of Patent: Aug. 3, 2021

(54) VALIDATING ROAD INTERSECTIONS

(71) Applicant: Waymo LLC, Mountain View, CA (US)

(72) Inventor: Michael Montemerlo, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 376 days.

(21) Appl. No.: 16/120,071

(22) Filed: Aug. 31, 2018

(65) Prior Publication Data

US 2020/0073977 A1 Mar. 5, 2020

(51) Int. Cl.

| | |
|---|---|
| *G08G 1/00* | (2006.01) |
| *G06F 16/23* | (2019.01) |
| *G08G 1/0968* | (2006.01) |
| *G01C 21/34* | (2006.01) |
| *G08G 1/0969* | (2006.01) |
| *G06F 16/29* | (2019.01) |
| *G06F 16/22* | (2019.01) |
| *G06F 16/901* | (2019.01) |

(52) U.S. Cl.
CPC ..... *G06F 16/2365* (2019.01); *G01C 21/3484* (2013.01); *G01C 21/3492* (2013.01); *G06F 16/2255* (2019.01); *G06F 16/29* (2019.01); *G06F 16/9024* (2019.01); *G08G 1/0969* (2013.01); *G08G 1/096833* (2013.01); *G08G 1/096894* (2013.01)

(58) Field of Classification Search
None
See application file for complete search history.

(56) References Cited

U.S. PATENT DOCUMENTS

| | | |
|---|---|---|
| 8,000,897 B2 | 8/2011 | Breed et al. |
| 2007/0014488 A1 | 1/2007 | Chen et al. |
| 2011/0280453 A1 | 11/2011 | Chen et al. |
| 2013/0013204 A1 | 1/2013 | Kazama et al. |
| 2013/0090850 A1 | 4/2013 | Mays |
| 2013/0322702 A1 | 12/2013 | Piemonte et al. |
| 2014/0095072 A1 | 4/2014 | Raab |

(Continued)

OTHER PUBLICATIONS

PCT International Search Report and Written Opinion in International Appln. No. PCT/US2019/048007, dated Dec. 12, 2019, 11 pages.

(Continued)

*Primary Examiner* — James M McPherson
(74) *Attorney, Agent, or Firm* — Fish & Richardson P.C.

(57) ABSTRACT

Methods, systems, and techniques for validating road intersections are presented. The method includes receiving annotated intersection data that, for each lane of a particular candidate intersection, indicates one or more attributes of the lane; processing the annotated intersection data to generate an intersection fingerprint for the particular candidate intersection that is sensitive to a topological structure of the lanes of the particular candidate intersection and is invariant to a geometry of the lanes of the particular candidate intersection; designating the particular candidate intersection as validated without performing the one or more quality control processes based at least on the intersection fingerprint; and storing a representation of the particular candidate intersection in the roadgraph.

20 Claims, 2 Drawing Sheets

(56) References Cited

U.S. PATENT DOCUMENTS

| | | | |
|---|---|---|---|
| 2015/0154243 A1* | 6/2015 | Danaher | G06F 16/215 |
| | | | 707/690 |
| 2017/0241791 A1 | 8/2017 | Madigan et al. | |
| 2017/0294036 A1* | 10/2017 | Dorum | G06T 11/203 |
| 2019/0050647 A1* | 2/2019 | Malkes | G06K 9/00785 |

OTHER PUBLICATIONS

PCT International Preliminary Report on Patentability in International Appln. No. PCT/US2019/048007, dated Mar. 11, 2021, 7 pages.

* cited by examiner

RECEIVING ANNOTATED INTERSECTION DATA THAT INDICATES ATTRIBUTES OF ONE OR MORE LANES OF A CANDIDATE INTERSECTION  202

PROCESSING THE ANNOTATED INTERSECTION DATA TO GENERATE AN INTERSECTION FINGERPRINT FOR THE CANDIDATE INTERSECTION  204

DESIGNATING THE CANDIDATE INTERSECTION AS VALIDATED BASED AT LEAST ON THE INTERSECTION FINGERPRINT  206

STORING A REPRESENTATION OF THE CANDIDATE INTERSECTION IN A ROADGRAPH  208

FIG. 2

VALIDATING ROAD INTERSECTIONS

TECHNICAL FIELD

This disclosure relates generally to navigating and route-planning using roadgraphs.

BACKGROUND

Navigation systems can use roadgraphs, which include descriptions of intersections and roadways, to plan safe and legal routes for a vehicle to travel.

SUMMARY

Road intersections are regions in a road network in which vehicles with different headings and speeds interact in close proximity. A vehicle navigation system can use roadgraphs, which include descriptions of intersections and roadways, to plan safe and legal trajectories for the vehicle, to understand precedence for yielding decisions, and to predict the behavior of other vehicles. The increased risk of collisions at intersections makes it especially important to ensure that the intersection descriptions contained in roadgraphs are accurate. To ensure the accuracy of the intersection descriptions of a roadgraph, a system may require candidate descriptions of intersections to successfully complete one or more quality control processes, where the quality control processes can be implemented by computer systems or, in some cases, human operators.

In some implementations, using annotated intersection data, a system can generate a fingerprint for a candidate description of an intersection, where the fingerprint is sensitive to the topological structure of the lanes of the intersection, but invariant to the particular geometry of the intersection. For example, the fingerprint can be sensitive to a driveability relationship of the lanes of the intersection (e.g., the number of lanes, the arrangement of lanes, the fan-out of the lanes), but insensitive to a geometric relationship of the lanes (e.g., the width of the lanes, the distance between lanes, the angle between lanes).

The fingerprint can be, for example, a hash value generated based on one or more attributes of the intersection lanes. The attributes of the lanes can include properties of an individual lane, such as a type of lane (e.g., turn lane, through lane, U-turn lane), the existence of lane control measures (e.g., traffic light, stop sign, yield sign), whether the lane has any entry or exit siblings (e.g., the lanes fan-out of a common lane or merge into a common lane), and whether the lane crosses a through lane. The attributes of the lanes can also include properties of pairs of lanes (e.g., lane-pair properties), such as the arrangement of the lanes (e.g., the lanes are adjacent to each other, the lanes cross each other), whether the lanes are entry or exit siblings (e.g., the lanes share a common entry or exit lane), and whether the lanes share a common start heading (e.g., traffic in the lanes enter the intersection from a same direction) or end heading (e.g., traffic in the lanes exit the intersection in a same direction).

To validate a candidate intersection description without performing one or more quality control processes, the system can compare the candidate intersection fingerprint to one or more intersection templates that are known to describe valid intersection configurations. For example, the system can generate a value indicating the extent to which the candidate intersection is similar to the intersection template (e.g., a distance between the hash values of the candidate intersection fingerprint and an intersection template fingerprint). If the candidate intersection fingerprint is sufficiently similar to a validated intersection template, the system can designate the candidate description of the intersection as valid without performing additional quality control processes. The system can then store a representation of the validated candidate intersection description in a roadgraph for use by a vehicle in navigation and route-planning.

In some implementations, a system includes (i) a quality assurance engine that designates, as validated, candidate intersections that have successfully completed one or more quality control processes, (ii) one or more databases that store a roadgraph, and (iii) a roadgraph manager that causes representations of validated, candidate intersections to be stored in the roadgraph. The system can perform a method that includes the operations of (i) receiving, by the system, annotated intersection data that, for each lane of a particular candidate intersection, indicates one or more attributes of the lane; (ii) processing, by the system, the annotated intersection data to generate an intersection fingerprint for the particular candidate intersection that is sensitive to a topological structure of the lanes of the particular candidate intersection and is invariant to a geometry of the lanes of the particular candidate intersection; (iii) designating, by the system, the particular candidate intersection as validated without performing the one or more quality control processes based at least on the intersection fingerprint for the particular candidate intersection; and (iv) in response to designating the particular candidate intersection as validated, storing, by the system, a representation of the particular candidate intersection in the roadgraph.

In some implementations, the annotated intersection data received by the system includes at least one of (i) annotated image data of the particular candidate intersection or (ii) annotated radar data of the particular candidate intersection.

In some implementations, at least one of the one or more attributes of the lane indicated by the annotated intersection data comprise an attribute of a pair of lanes. In some implementations, at least one of the one or more attributes of the lane indicated by the annotate intersection data comprise an attribute of an individual lane.

In some implementations, the topological structure of the lanes of the particular candidate intersection includes a topological property of one or more lanes of the particular candidate intersection that does not change under a geometric distortion. For example, the topological property of the one or more lanes of the particular candidate intersection can include at least one of a number of lanes, an arrangement of lanes, or a fan-out of a lane. In some implementations, the geometry of the lanes of the particular candidate intersection can include at least one of a width of a lane, a distance between lanes, or an angle between lanes.

In some implementations, processing the annotated intersection data to generate an intersection fingerprint for the particular candidate intersection includes processing the annotated intersection data to generate a hash value for the particular candidate intersection that is sensitive to a topological structure of the lanes of the particular candidate intersection and is invariant to a geometry of the lanes of the particular candidate intersection. For example, in some implementations, each of the one or more attributes of the lanes indicated by the annotated intersection data is represented by a binary value for the attribute, and generating a hash value for the particular candidate intersection includes (i) combining the binary values for one or more of the attributes of the lanes of the particular candidate intersection to generate one or more strings, and (ii) based on at least the one or more strings, generating a hash value for the particular candidate intersection that is sensitive to a topological structure of the lanes of the particular candidate intersection and is invariant to a geometry of the lanes of the particular candidate intersection. The system can then designate the particular candidate intersection as validated without performing the one or more quality control processes based at least on the hash value for the particular candidate intersection.

In some implementations, designating the particular candidate intersection as validated without performing the one or more quality control processes based at least on the intersection fingerprint includes (i) accessing, by the system, an intersection template, (ii) comparing the intersection fingerprint for the particular candidate intersection and the intersection template, (iii) based on the comparison, generating a value that reflects the extent to which the particular candidate intersection is associated with the intersection template, (iv) determining that the value that reflects the extent to which the particular candidate intersection is associated with the intersection template satisfies a threshold, and (iv) based on determining that the value that reflects the extent to which the particular candidate intersection is associated with the intersection template satisfies the threshold, designating the particular candidate intersection as validated without performing the one or more quality control processes.

The intersection template can be, for example, a fingerprint for an intersection that was designated as valid by performing the one or more quality control processes.

In some implementations, the above-described method can be performed by one or more computer systems, for example, by a system includes one or more processing devices and one or more storage devices storing instructions that are operable, when executed by the one or more processing devices, to perform the above described operations. In some implementations, one or more computer-readable storage media stores a computer program, the computer program including instructions that, when executed by one or more processing devices, cause the one or more processing devices to perform the above-described operations.

Certain implementations of the disclosed systems, techniques, and methods have particular features and advantages. A candidate intersection description can be validated by comparing its fingerprint with already-validated intersection templates, eliminating the need to perform additional quality control processes, and reducing the time and computing resources necessary for validation. For example, comparing an intersection fingerprint with an already-validated intersection template enables evaluation of multiple validators (e.g., compatible lane controls, suspicious lane endings, suspicious merges, and suspicious lane crossings) simultaneously, speeding the validation process compared to methods that evaluate validators individually and/or sequentially. In addition, rather than requiring computationally-intensive modeling and analysis of the annotated intersection data to generate the high-level intersection representation or identify the meaningful intersection structures (e.g., dedicated turn lanes or slip lanes) necessary for many automated quality control processes, the intersection fingerprint can distinguish intersection structures based on a set of individual lane and lane-pair attributes, providing for validation with significantly less computational effort. In some cases, unique or unusual intersection features can be identified in the fingerprint and those features submitted for additional quality control measures or brought to the attention of a human quality control engineer.

In some implementations, the intersection fingerprint can be stored along with the intersection representation for the roadgraph and used to prevent the errors during roadgraph updates. For example, a roadgraph update may remove a stop sign at the intersection. If the fingerprint of the updated intersection is sufficiently different from the fingerprint of the original intersection or from the fingerprint of an already-validated intersection template, the system can flag the update as a potential error and submit the updated intersection for additional quality control processes.

In addition to validation, based on analyzing the fingerprints of a set of validated intersections, the method can make one or more inferences about intersections that can be used by software applications or humans building maps and roadgraphs. For example, a system may be able to generate an intersection for an incomplete roadgraphs that is missing a description for a particular intersection based on a fingerprint for a set of input and output lanes and/or the traffic-control signals for the particular intersection, the system can identify one or more compatible, already-validated intersection templates and add a description of a selected template to complete the roadgraph.

As another example, the system can determine a probable lane configuration for one side of an intersection based on a lane configuration for an opposite side of the intersection. As yet another example, the system can determine a probable traffic light configuration based on a particular intersection topology (e.g., an arrangement of lanes, a relationship between lanes, etc.).

The details of one or more implementations are set forth in the accompanying drawings and the description below. Other potential features and advantages of the disclosure will be apparent from the description, the drawings, and the claims.

BRIEF DESCRIPTION OF THE DRAWINGS

Like reference numbers and designations in the various drawings indicate like elements.

DETAILED DESCRIPTION

Figure 1:
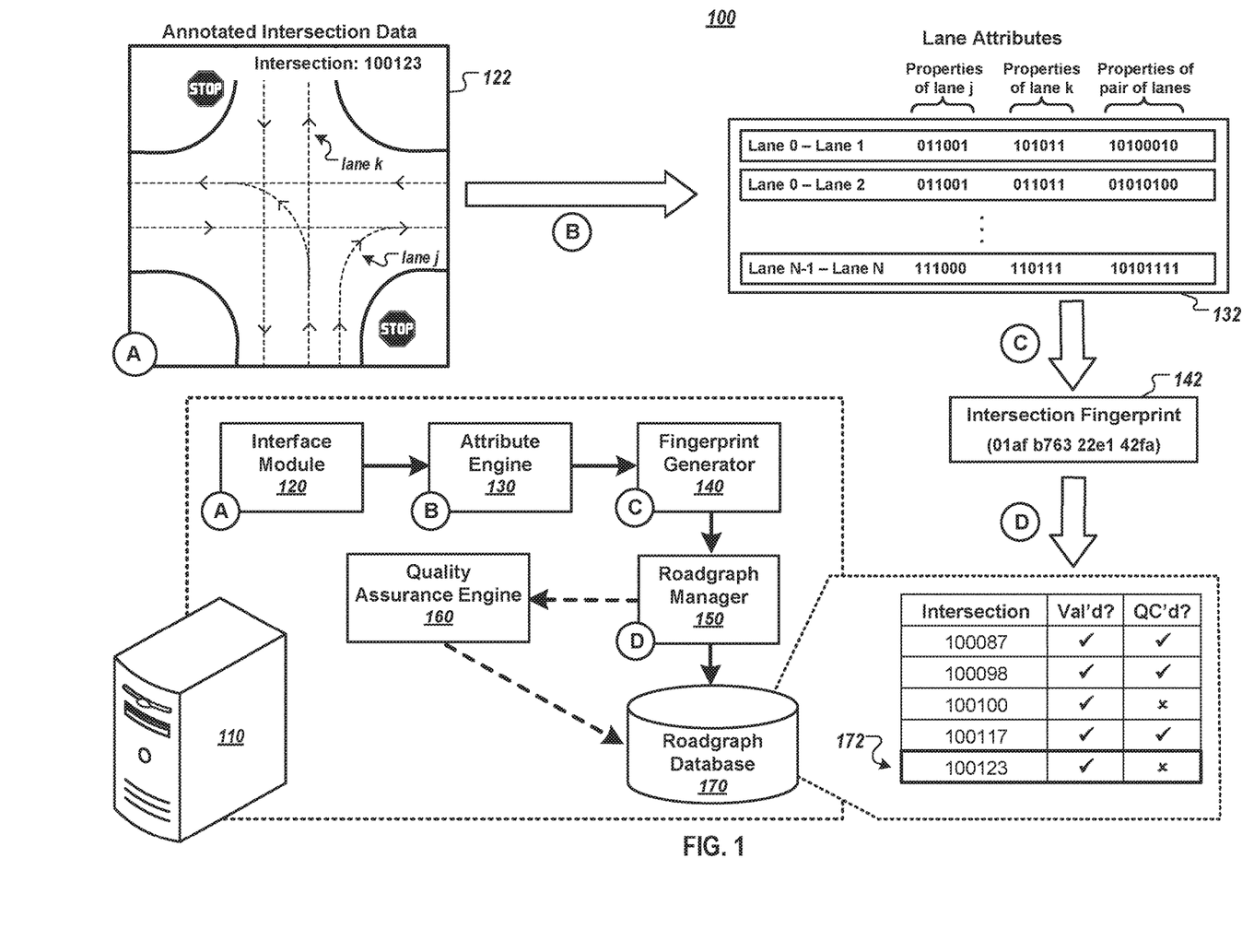
FIG. 1 is a diagram illustrating an example of a system for validating road intersections without performing one or more quality control processes.

FIG. 1 is a diagram illustrating an example of a system 100 for validating road intersections without performing one or more quality control processes. The system 100 includes a computer system 110, which stores validated roadgraph data in a database 170. The computer system 110 also includes a quality assurance engine 160, which can perform various quality control processes to validate roadgraph data before the data is stored in the database 170.

For some road intersections, the computer system 110 can validate a candidate description of the intersection without performing the quality control processes. For these intersections, the system 110 receives annotated intersection data 122 describing the candidate intersection and, based on the data 122, generates an intersection fingerprint 142 for the candidate intersection. By processing the generated fingerprint 142, the computer system 110 can designate the candidate intersection as validated without performing the quality control processes of the quality assurance engine 160, reducing the time and computing resources necessary for validation. FIG. 1 includes stages (A) through (D), which represent a process flow for validating road intersections without performing one or more quality control processes.

A roadgraph includes data that describes a road network. Like a map, the roadgraph data indicates the location of roads, intersections, and other structures used for route planning. The roadgraph data also includes road features that are relevant for vehicular navigation, including data indicating particular lanes, traffic control devices (e.g., stop signs, yield signs), driving rules (e.g., turn restrictions, carpool lanes), and other data used for navigation. A vehicle navigation system, such as a navigation system for a manned or autonomous vehicle, can use the roadgraph data to plan safe and legal trajectories for the vehicle, to understand precedence for yielding decisions, and to predict the behavior of other vehicles on the roads.

The roadgraph data includes data describing road intersections. Road intersections are regions in a road network in which vehicles with different headings and speeds interact in close proximity. For example, a road intersection can occur where two or more roads intersect, where a road joins another road, or where a road splits into multiple roads. In some implementations, intersections are represented in the roadgraph as polygonal regions, with links to each of the lanes that pass through the intersection, as well as the traffic controls (e.g., traffic lights, stop signs, yield signs) associated with each intersection.

The complexity of potential vehicle interactions at intersections increases the risk of collisions, making it especially important to ensure that the roadgraph data describing intersections is accurate and complete. To ensure the accuracy of the intersection descriptions of a roadgraph, a system may require candidate descriptions of intersections to successfully complete one or more quality control processes, where the quality control processes can be implemented by computer systems or, in some cases, human operators. For example, the quality assurance engine 160 can automatically perform one or more quality control processes that analyze the candidate intersection against a set of rules for intersections or that search the candidate intersection for common errors in intersection descriptions. In some implementations, one or more of the quality control processes may require input from a human operator (e.g., to identify and label errors). The quality assurance engine 160 can then designate a candidate intersection that has successfully completed the one or more quality control processes as validated and store a representation of the validated candidate intersection as roadgraph data in a roadgraph database.

Many automatic validation processes require generation of a high-level representation of the intersection (e.g., characterizing the intersection as a four-way intersection with two stops) or identification of particular intersection structures (e.g., dedicated turn lanes, slip lanes) to determine intersection validity. However, generating such high-level representations and identifying the particular intersection structures can be unreliable and can require extensive modeling and analysis. Other processes require human operator input, which can significantly slow the validation process. The system 100 enables validation of candidate intersection descriptions without requiring performance of quality control processes by the quality assurance engine 160, reducing the time and computing resources required for validation.

The system 100 includes the computer system 110. The computer system 110 can be, for example, one or more computers or servers, e.g., a server system, that execute instructions to perform various operations for the system 100. The computer system 110 can include one or more CPUs, GPUs, memory systems or other computer hardware, such as one or more processors, chipsets, general-purpose computing systems, memory systems, and data storage systems. In some implementations, the computer system 110 can include a cloud computing platform, or another remote and/or distributed computing system.

The computer system 110 includes one or more process modules for performing various steps of the process. For example, the computer system 110 can include an interface module 120, an attribute engine 130, a fingerprint generator 140, a roadgraph manager 150 and a quality assurance engine 160. The modules can be implemented in any combination of hardware and/or software. For example, one or more of the modules may be implemented as a software application that is executed by an operating system of the computer 110. In some implementations, one or more of the modules can include dedicated processing hardware, such as digital signal processing hardware, application-specific integrated circuits (ASICs), field-programmable-gate arrays (FPGAs), or other specialized hardware.

In stage (A), the interface module 120 receives annotated intersection data 122 of a candidate intersection. The annotated intersection data 122 can be, for example, image data of the candidate intersection or radar data of the candidate intersection (e.g., data obtained by an aerial camera, or by a camera or radar system attached to a vehicle), where the image data or radar data has been annotated to indicate various features of the intersection. For example, the data 122 can be annotated to indicate the location and direction of travel along one or more lanes of the intersection, lanes for legal turns, merge lanes, or other lane features. The data 122 can also be annotated to indicate the presence of traffic control devices, such as traffic lights, stop signs, and yield signs. In some cases, the annotation can indicate legal driving restrictions for the candidate intersection, such as prohibitions on U-turns, or carpool-only lanes.

The data 122 can be annotated automatically, e.g., by the computer system 110 or another computer system that processes the data 122 to generate the annotations. The data 122 can also be annotated manually, e.g., by one or more humans that evaluate the data 122 and input the annotations to a computer system.

In the example of FIG. 1, the computer system 122 receives the annotated intersection data 122, which includes data for a particular candidate intersection "100123." The annotated intersection data 122 includes, among other features, indications of lane k, which is a through lane (e.g., the lane exits the intersection at a side opposite to the side it enters the intersection), and lane j, which is a right turn lane. The annotated intersection data 122 also indicates that both lanes j and k are controlled by a stop sign.

In stage (B), the attribute engine 130 determines one or more lane attributes 132 for the candidate intersection based on the annotated data 122. The lane attributes 132 determined by the attribute engine 130 describe topological properties of one or more lanes of the candidate intersection that can be used by the system 100 to categorize the intersection into, and differentiate between, various intersection types and geometries. The topological lane properties can describe a feature of an individual lane (e.g., a direction of travel, a type of lane, a traffic control device of the lane) or a relationship among several lanes (e.g., a number of lanes, an arrangement of lanes, a fan-out of a lane) that is invariant to the particular geometry of the intersection (e.g., properties that are unaffected by geometric distortions such as stretching part of the intersection, rotating the intersection, shrinking the intersection, or other geometric distortions). Typically, the lane attributes 132 do not include geometric properties of the intersection, such as a width of a lane, a distance between lanes, an angle between lanes, or other geometric properties that are sensitive to geometric distortions.

As show in FIG. 1, the lane attributes 132 can indicate properties of individual lanes (e.g., "Properties of lane j", "Properties of lane k"). For example, the attributes 132 can indicate a direction of travel for the lane, whether a lane is a through lane (e.g., the lane exits the intersection at a side opposite to the side it enters the intersection), a turn lane, a U-turn lane, or another type of lane. The attributes 132 can indicate whether the lane is controlled by a traffic light, a stop sign, a yield sign, or another traffic control mechanism. In some implementations, the attributes 132 can indicate whether the lane includes an "implied stop," where driving convention requires vehicles to stop even if there is no traffic light or stop sign (e.g., when exiting a parking lot).

The individual lane attributes 132 can indicate the precedence of a lane, e.g., whether traffic traveling in the lane must yield to traffic traveling in another lane of the intersection. For example, a through lane that connects two lanes on opposite sides of an intersection may have precedence over a turn lane that connects two lanes on adjacent sides of an intersection. In some implementations, the attributes 132 can indicate a confidence level associated with a particular individual lane (e.g., the likelihood that the lane designation and topology indicated by the annotation represents the true lane features).

The individual lane attributes 132 can also indicate how many entry or exit siblings a lane of the candidate intersection has. Entry siblings are lanes that share a common predecessor (e.g., entry) lane, while exit siblings are lanes that share a common successor (e.g., exit) lane. Entry siblings represent fan-outs of lanes, while exit siblings represent fan-ins or merges of lanes.

In some implementations, the individual lane attributes 132 indicate whether a particular lane crosses another lane, how many other lanes the particular lane crosses, and/or the precedence or type (e.g., through lane, turn lane, merge lane) of lanes that the particular lane crosses.

The attributes 132 can also indicate properties of pairs of lanes (e.g., lanes j, k) of the candidate intersection, as shown in FIG. 1. For a particular pair of lanes, the lane-pair attributes 132 can indicate properties indicating whether the two lanes are entry siblings that fan-out from a common entry lane, or whether the two lanes are exit siblings that fan-in (e.g., merge) to a common exit lane.

The lane-pair attributes 132 can also indicate an arrangement of lanes. For example, the attributes 132 can indicate whether one lane is adjacent to another lane, whether the lanes share a common start heading (e.g., traffic in the lanes enter the intersection from a same direction) or whether the lanes share a common end heading (e.g., traffic in the lanes exit the intersection in a same direction). The lane-pair attributes 132 can indicate whether the two lanes are opposing lanes (e.g., the lanes have opposite start headings and opposite end headings).

In some cases, the attributes 132 can include lane pair properties selected to break symmetries that may exist in similar, but geometrically distinguishable, intersections. For example, without any notion of directionality (e.g., left or right), an intersection that includes a through lane and a dedicated left turn lane could be confused with an intersection that includes a dedicated right turn lane. To differentiate between intersections with such symmetries, the attributes 132 can include directional properties, such as whether a particular lane of the pair is to the right (or left) of the other lane. In some implementations, such directional lane-pair properties (e.g., lane j is to the right of lane k) can be computed more reliably from the annotated intersection data 122 more than individual lane properties that could provide similar information (e.g., lane j is a dedicated right turn lane), providing a more robust description of the candidate intersection.

In some implementations, the attribute engine 130 maps the attributes 132 of the candidate intersection to one or more strings. For example, the attribute engine 130 can represent each property by a binary value (e.g., "0" or "1") indicating whether the lane or pair of lanes exhibits the property. The engine 130 can then generate a string for each pair of lanes in the intersection by concatenating the binary values representing each lane or lane pair property.

For example, as shown in FIG. 1, for an intersection with N lanes, the attribute engine 130 can generate a set of N*(N−1) strings, one string for each pair of lanes (j,k) in the intersection. Each string can include three substrings, a first substring representing the individual properties of lane j, a second substring representing the individual properties of lane k, and a third substring representing the properties of lanes j and k considered together (e.g., the lane pair properties).

In stage (C), the fingerprint generator 140 of the computer system 110 processes data indicating the lane attributes 132 to generate an intersection fingerprint 142 for the candidate intersection described by the annotated intersection data 122. Because the intersection fingerprint 142 is based on topological properties of the intersection captured by the lane attributes 132, the fingerprint 142 provides a representation of the candidate intersection that is sensitive to the topological structure of the lanes in the intersection and other important roadgraph properties (e.g., the presence of a traffic control device), while being invariant to the geometric differences common in real intersections (e.g., a width of a lane, an angle between lanes, a distance of the intersection, etc.).

In some implementations, the fingerprint generator 140 is a hash function that maps the lane attributes 132 to the intersection fingerprint 142 (e.g., a hash value). For example, the generator 140 can sort the lane-pair attribute strings for the candidate intersection lexicographically (e.g., ordering based on string value) and append them together to generate a hash value for the intersection fingerprint 142. By sorting the strings in lexicographic order before appending them, the fingerprint 142 can be invariant to the iteration order of the lanes.

In some implementations, the intersection fingerprint for an intersection can be generated and/or analyzed with varying levels of specificity. For example, the fingerprint generator 140 can generate a more specific intersection fingerprint 142 using a large number (e.g., all) of the properties captured in the lane attributes 132 for the candidate intersection. Alternatively, the generator 140 can generate a more general intersection fingerprint 142 of the candidate intersection using a smaller number (e.g., a selected set) of the lane attributes 132.

Any of the individual lane and/or lane-pair lane attributes 132 can be used to generate the intersection fingerprint 142, however the particular attribute 132 selected can affect the ability of the system 100 to differentiate between different intersection types and geometries. In some implementations, the generator 140 may intentionally exclude particular attributes of an individual lane or a pair of lanes that are determined to have a minimal impact on intersection validation, intersection differentiation, or other analysis objectives.

In stage (D), based on the generated fingerprint 142, the roadgraph manager 150 evaluates whether the candidate intersection described by the annotated intersection data 122 represents a valid intersection that can be added to a roadgraph. In some implementations, the road graph manager 150 access a set of one or more intersection templates corresponding to intersections that are known to be valid. The manager 150 can then determine whether the candidate intersection is valid by comparing the intersection's fingerprint 142 to the one or more intersection templates. If the candidate intersection fingerprint 142 sufficiently matches an already-validated intersection template, the manager 150 can designate the candidate intersection as valid.

The intersection templates can be generated by any of various techniques. In some implementations, an intersection template may be generated by determining a fingerprint or other representation for an intersection previously validated by the quality assurance engine 160, a human operator, or another validation technique. In some implementations, an intersection template is generated by identifying a cluster of previously-validated intersections with similar properties (e.g., similar fingerprints) and determining a fingerprint or other representation for the cluster. The one or more intersection templates may be stored in a database that can be accessed by the roadgraph manager 150 (e.g., stored in a local memory system of the computer system 110 or in a remote memory system accessible by the computer system 110 over a network) when validating the candidate intersection.

The roadgraph manager 150 can compare the candidate intersection fingerprint 142 to an intersection template to generate a value that reflects the extent to which the particular candidate intersection is associated with an intersection template. The value can, for example, indicate an extent to which the candidate intersection and template are similar or an extent to which they share certain intersection features. In some implementations, the generated value is a distance between the fingerprint 142 and the intersection template (e.g., a distance between hash values of the fingerprint 142 and the intersection template). In some implementations, the generated value is a match score that indicates the extent to which the fingerprint 142 and the template are similar (e.g., "match"), or a confidence value that the fingerprint 142 and the intersection template are of the same intersection type or topology (e.g., a four-way intersection with a stop signs at two entrances to the intersection with opposite headings).

Based on the generated value, the roadgraph manager 150 can designate the candidate intersection as valid. In some implementations, the manager 150 designates the candidate intersection as valid if the value that reflects the extent to which the candidate intersection is associated with an intersection template satisfies a threshold.

For example, the roadgraph manager 150 can designate the candidate intersection as valid if the generated distance between the hash value of the intersection fingerprint 142 and an intersection template is within a particular distance threshold. In another example, the manager 150 can designate the candidate intersection as valid if the generated match score between the fingerprint 142 and an intersection template is within a particular match threshold (e.g., if the fingerprint 142 and template match with a particular confidence level). In yet another example, the manager 150 can designate the candidate intersection as valid if the generated confidence value indicates that the fingerprint 142 and the template are of the same intersection topology with a particular threshold confidence level.

After designating the candidate intersection as valid, the roadgraph manager 150 stores a representation 172 of the candidate intersection in the roadgraph database 170. The database 170 can be, for example, one or more network attached storage (NAS) devices or other memory systems that are accessible by the computer system 110 and which store roadgraph data that describes a road network. After the representation of the validated candidate intersection is stored in the roadgraph database 170, the roadgraph data including the representation of the validated intersection can be made available to a vehicle for route planning and navigation.

The representation 172 of the candidate intersection stored in the roadgraph database 170 can include any of the various data necessary for describing the intersection in a roadgraph. For example, the representation 172 can include some or all of the annotated intersection data 122 for the candidate intersection and/or the lane attributes 132 determined by the attribute engine 130. In some implementations, the representation 172 includes data indicating the intersection fingerprint 142 for the candidate intersection or other information identifying the type, topology, or intersection template associated with the candidate intersection.

If the roadgraph manager 150 does not designate the candidate intersection as valid (e.g., the value that reflects the extent to which the candidate intersection is associated with an intersection template does not satisfy the threshold), the manager can provide the annotated intersection data 122 and any other necessary intersection data to the quality assurance engine 160. The quality assurance engine 160 can then perform one or more quality control processes on the annotated intersection data 122 to determine whether the candidate intersection is a valid intersection. The engine 160 can then store a representation of any validated candidate intersection in the roadgraph database 170.

Typically, the quality assurance engine 160 includes various automatic, semi-automatic (e.g., with limited human operator input), or human-operator-performed quality control processes to determine whether a particular candidate intersection is valid. In some examples, the quality control processes evaluate one or more validators (e.g., compatible lane controls, suspicious lane endings, suspicious merges, and suspicious lane crossings), which can require computationally-intensive modeling and analysis of the data 122 to generate the high-level representations necessary for evaluation. In other examples, the quality control processes require input from a trained human operator (e.g., to verify unconventional lane arrangements or confirm suspicious intersection feature labeling), which can be time consuming and prone to mistakes due to human error. By enabling a subset of the candidate intersections to be validated by the roadgraph manager 150 without having to perform one or more of the quality control processes of the assurance engine 160, the system 100 provides a more efficient and robust method for validating those candidate intersections which can be associated with an already-validated intersection template.

In some implementations, the system 100 further provides an efficient and effective means for identifying errors within a roadgraph. For example, for each intersection in a roadgraph, the system can generate a fingerprint, as described above for the candidate intersection, and analyze the generated fingerprints to identify clusters of intersections representing common intersection types and topologies. Based on the identified clusters, the system 100 can identify any outlier intersection fingerprints that do not sufficiently match a common intersection cluster. The outlier intersections can then be labeled as containing potential errors and can be flagged for further examination (e.g., by a quality control process, such as the processes performed by the quality assurance engine 160 or by a human operator). In some implementations, the system 100 may be able to characterize the potential error by identifying the one or more lane properties that distinguish an outlier intersection from a nearby intersection cluster. In some implementations, the intersection clusters can be used to determine intersection templates for the validation process performed by the roadgraph manager (e.g., by generating an intersection template to represent an intersection cluster).

In some cases, an intersection may be an outlier due to a mistake in the annotation process (e.g., the intersection fingerprint did not represent the true intersection topology), in which case the annotation can be corrected. For example, the annotated data 122 for an intersection may be incomplete (e.g., missing one or more lanes, traffic control devices, etc.) or mislabeled. The outlier intersection can be flagged for further review and correction by a computer algorithm or a human operator before the roadgraph containing the intersection is provided to a vehicle. In some examples, the outlier intersections can be analyzed to determine common errors in the annotation process (e.g., inconsistent representation of parking lot entrances and exits, incorrect mapping of turns across multiple lanes). Information related to the common errors can then be used to improve the human or computer-implemented annotation processes.

In other cases, an intersection may be an outlier due to an unusual or unconventional topology of the actual intersection. In these cases, the particular outlier intersection can be flagged during route-planning, signaling to a vehicle that it should potentially apply additional caution when navigating through the unusual or unconventional intersection.

In some implementations, the intersection fingerprints for a roadgraph can be analyzed for other mapping, planning, and navigation purposes. For example, using data indicating failed or aborted navigation attempts at particular intersections, the system 100 may be able to identify particular intersection fingerprints or features that are not well-navigated using current algorithms and thus direct algorithm-improvement efforts. In another example, the system may be able to associate safety data (e.g., indicating safety incidents or accidents at various intersections) with particular intersection fingerprints or features to identify particularly dangerous intersection types that would benefit from additional awareness measures or precautions during navigation.

Figure 2:
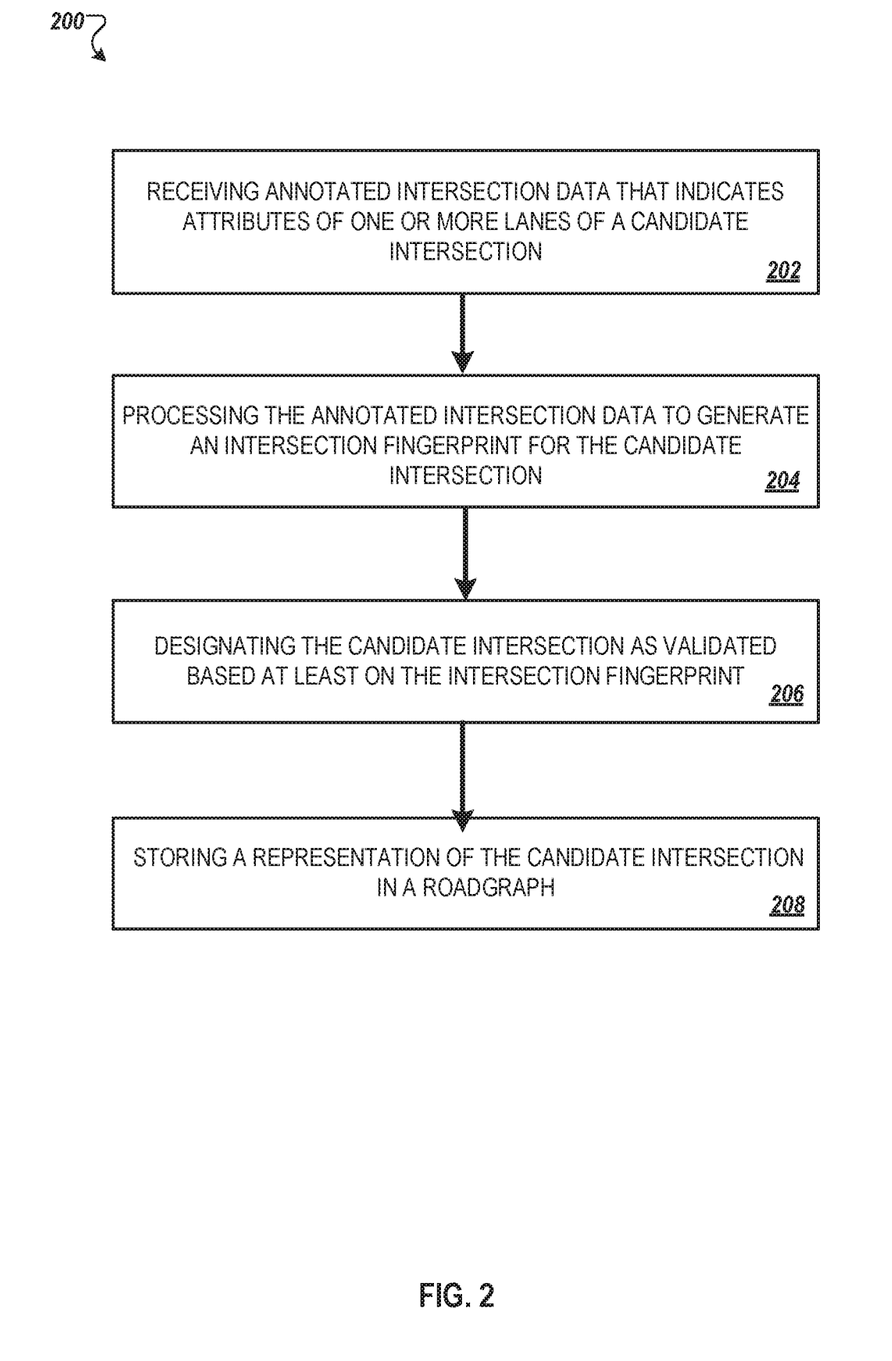
FIG. 2 is a flowchart illustrating an example of a method for validating road intersections without performing one or more quality control processes.

FIG. 2 is a flowchart illustrating an example of a method 200 for validating road intersections without performing one or more quality control processes. The method 200 can be performed by one or more computer systems, such as the computer system 110 of FIG. 1. In brief, the method includes receiving annotated intersection data that indicates attributes of one or more lanes of a candidate intersection (202); processing the annotated intersection data to generate an intersection fingerprint for the candidate intersection (204); designating the candidate intersection as validated based at least on the intersection fingerprint (206); and storing a representation of the candidate intersection in a roadgraph (208). In some implementations, the computer system performing the method 200 includes a quality assurance engine, one or more databases, and a roadgraph manager, where the quality assurance engine is configured to validate candidate intersections that have successfully completed one or more quality control processes, the one or more databases are configured to store validated roadgraphs, and the roadgraph manager causes representations of validated candidate intersections in the roadgraph.

In more detail, the method 200 includes receiving, by the computer system, annotated intersection data that indicates attributes of one or more lanes of a candidate intersection (202). The annotated intersection data can be, for example, annotated versions of image data, radar data, lidar data, map data or other data that describes a topological structure of a particular proposed representation of an intersection (e.g., a candidate intersection). In some implementations, the annotated intersection data is generated by a computer system (e.g., by an algorithm that annotates an image using image processing or other data analysis techniques). In some implementations, the annotated intersection data includes annotations generated by a trained human operator.

The annotated intersection data includes annotations and/or labels that indicate one or more attributes for one or more lanes of the candidate intersection. The attributes can include properties related to an individual lane of the intersection, such as a location of a lane, a direction of traffic in the lane, an orientation of the lane, a fan-out or fan-in of the lane, and/or a traffic control device present for the lane (e.g., a stop sign, a traffic light, a yield sign). The attributes can also include properties related to pairs of lanes of the intersection (e.g., lane-pair properties), such as an arrangement of the lanes (e.g., whether one lane is to the left or right of another lane, whether the lanes share a common heading, whether the lanes are entry or exit siblings). Generally, the attributes indicated by the annotated intersection data include topological attributes that do not change under a geometric distortion.

In some implementations, an attribute of the candidate intersection is represented by a binary value (e.g., "0" and "1") indicating whether a particular property is present in the intersection. For example, the system may generate one or more strings of binary values for the candidate intersection, where each string indicates properties for a pair of lanes (j, k) of the intersection, as described by the annotated intersection data. In some implementations, each string for a pair of lanes (j, k) includes three substrings, a first substring that indicates individual lane properties of lane j, a second sub string that indicates individual lane properties of lane k, and a third sub string that indicates lane-pair properties for the pair of lanes (j, k).

The computer system processes the annotated intersection data to generate an intersection fingerprint for the candidate intersection (204). In some implementations, the system generates an intersection fingerprint that is a hash value. For example, where the candidate intersection attributes are represented by strings for each pair of lanes, the system may sort the strings for each pair of lanes lexographically and combine the strings (e.g., concatenate or append them) to generate a fingerprint hash value.

Because the intersection fingerprint is generated based only on topological lane attributes of the candidate intersection, it is sensitive to a topological structure of the lanes of the candidate intersection while being invariant to a geometry of the lanes of the candidate intersection. For example, the intersection fingerprint can be sensitive to topological properties, such as a number of lanes, an arrangement of lanes, a fan-out of a lane, or a merging of lanes, while being invariant to geometric properties of the intersection lanes (e.g., properties that change under geometric distortion), such as a width of a lane, a distance between lanes, an angle between lanes, or a radius of a turn lane.

Based on at least the intersection fingerprint, the computer system designates the candidate intersection as validated (206). In some implementations, the system designates the candidate intersection as validated without performing one or more quality control processes that would otherwise be performed by a quality assurance engine of the computer system.

For example, the system can compare the intersection fingerprint to an intersection template that describes an already-validated intersection and generate a value that reflects the extent to which the candidate intersection is associated with the intersection template. In some implementations, the intersection template is a hash value of a fingerprint for an already-validated intersection and the generated value is a distance between the hash values of the candidate intersection fingerprint and the intersection template. The generated value can also be a match score that indicates a level of similarity between the candidate intersection and the intersection template, a confidence value that indicates a confidence that the candidate intersection and intersection template are of the same type, or another value that indicates an association between the candidate intersection and the intersection template.

If the system determines that the generated value satisfies a threshold, the system can designate the candidate intersection as validated without performing one or more quality control processes. For example, the system can determine that the generated distance between hash values of the candidate intersection fingerprint and the intersection template is within a distance threshold, that the generated match score indicating the similarity between the candidate intersection and intersection template is within a match threshold, or that the generated confidence value that the candidate intersection and intersection template are of the same intersection topology satisfy a threshold confidence level.

In some implementations, the intersection templates are generated by the system (e.g., by analyzing fingerprints of already-validated intersections), stored in a memory system, and accessed by the system for comparison with the generated candidate intersection fingerprint. In some implementations, the intersection templates can be fingerprints of intersections that were designated as valid by successfully completing one or more quality control processes (e.g., processes performed by the quality assurance engine or a human operator).

In response to designating the candidate intersection as valid, the computer system stores a representation of the candidate intersection in a roadgraph (208). In some implementations, the representation of the candidate intersection is stored in a roadgraph that is part of a roadgraph database. The representation of the candidate intersection stored in the roadgraph can include some or all of the annotated intersection data. The stored representation can also include data indicating one or more of the attributes of the candidate intersection, as well as data indicating the generated fingerprint for the candidate intersection. After storing the representation, the roadgraph data, including the representation of the validated candidate intersection, can be provided to a vehicle for navigation and route planning.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Thus, particular embodiments of the invention have been described. Other embodiments are within the scope of the following claims. For example, the actions recited in the claims may be performed in a different order and still achieve desirable results.

What is claimed is:

1. A computer-implemented method comprising:
   receiving, by a system that comprises (i) one or more databases that store a roadgraph for use by a vehicle navigation system, and (ii) a roadgraph manager that causes representations of validated, candidate intersections to be stored in the roadgraph, annotated intersection data representative of one or more attributes of each lane of a plurality of lanes of a particular candidate intersection;
   processing, by the system, the annotated intersection data to generate an intersection fingerprint for the particular candidate intersection, the intersection fingerprint being representative of a topological structure of the plurality of lanes of the particular candidate intersection;
   designating, by the system, the particular candidate intersection as validated based at least on comparing the intersection fingerprint for the particular candidate intersection with one or more previously validated intersection templates; and
   in response to designating the particular candidate intersection as validated, storing, by the system, a representation of the particular candidate intersection in the roadgraph for use by the vehicle navigation system.

2. The computer-implemented method of claim 1, wherein at least one of the one or more attributes comprise an attribute of a pair of lanes of the plurality of lanes.

3. The computer-implemented method of claim 1, wherein:
   processing the annotated intersection data to generate the intersection fingerprint for the particular candidate intersection comprises:
      processing, by the system, the annotated intersection data to generate a hash value for the particular candidate intersection; and
   designating the particular candidate intersection as validated based at least on comparing the intersection fingerprint for the particular candidate intersection with the one or more previously validated intersections comprises designating, by the system, the particular candidate intersection as validated based at least on the hash value for the particular candidate intersection.

4. The method of claim 3, wherein each of the one or more attributes is represented by a corresponding binary value; and
   wherein generating the hash value for the particular candidate intersection comprises:
      combining, by the system, the corresponding binary value for each of the one or more attributes to generate one or more strings; and
      generating, by the system, the hash value for the particular candidate intersection based at least on the one or more strings.

5. The method of claim 1, wherein designating the particular candidate intersection as validated based at least on comparing the intersection fingerprint with the one or more previously validated intersection templates comprises:

accessing, by the system, the one or more previously validated intersection templates;

comparing, by the system, the intersection fingerprint with the one or more previously validated intersection templates;

based at least on comparing the intersection fingerprint with the one or more previously validated intersection templates, generating, by the system, a value that reflects an extent to which the particular candidate intersection is associated with one or more previously validated intersection templates;

determining, by the system, that the value satisfies a threshold; and based on determining that the value satisfies the threshold, designating, by the system, the particular candidate intersection as validated.

6. The method of claim 5, wherein the one or more previously validated intersection templates comprises a fingerprint for an intersection that was designated as valid by performing one or more quality control processes of a quality assurance engine of the system.

7. The method of claim 1, wherein the topological structure of the plurality of lanes of the particular candidate intersection comprises a topological property of one or more lanes of the plurality of lanes that does not change under a distortion of geometry of the particular candidate intersection.

8. The method of claim 7, wherein the topological property of the one or more lanes comprises at least one of a number of lanes, an arrangement of lanes, or a fan-out of a lane; and wherein the geometry of the plurality of lanes of the particular candidate intersection comprises at least one of a width of a lane, a distance between lanes, or an angle between lanes.

9. The method of claim 1, wherein the annotated intersection data comprises at least one of annotated image data of the particular candidate intersection or annotated radar data of the particular candidate intersection.

10. A system comprising:

one or more processing devices and one or more storage devices storing instructions that are operable, when executed by the one or more processing devices, to cause the one or more processing devices to perform operations comprising:

receiving, by the one or more processing devices, annotated intersection data representative of one or more attributes of each lane of a plurality of lanes of a particular candidate intersection;

processing, by the one or more processing devices, the annotated intersection data to generate an intersection fingerprint for the particular candidate intersection, the intersection fingerprint being representative of a topological structure of the plurality of lanes of the particular candidate intersection;

designating, by the one or more processing devices, the particular candidate intersection as validated based at least on comparing the intersection fingerprint for the particular candidate intersection with one or more previously validated intersection templates; and in response to designating the particular candidate intersection as validated, storing, by the one or more processing devices, a representation of the particular candidate intersection in a roadgraph for use by a vehicle navigation system.

11. The system of claim 10, wherein at least one of the one or more attributes comprise an attribute of a pair of lanes of the plurality of lanes.

12. The system of claim 10, wherein:

processing the annotated intersection data to generate the intersection fingerprint for the particular candidate intersection comprises:

processing, by the one or more processing devices, the annotated intersection data to generate a hash value for the particular candidate intersection; and designating the particular candidate intersection as validated based at least on comparing the intersection fingerprint for the particular candidate intersection with the one or more previously validated intersections comprises designating, by the one or more processing devices, the particular candidate intersection as validated based at least on the hash value for the particular candidate intersection.

13. The system of claim 12, wherein each of the one or more attributes is represented by a corresponding binary value; and wherein generating the hash value for the particular candidate intersection comprises:

combining, by the one or more processing devices, the corresponding binary value for each of the one or more attributes to generate one or more strings; and generating, by the one or more processing devices, the hash value for the particular candidate intersection based at least on the one or more strings.

14. The system of claim 10, wherein designating the particular candidate intersection as validated based at least on comparing the intersection fingerprint with the one or more previously validated intersection templates comprises:

accessing, by the one or more processing devices, the one or more previously validated intersection templates;

comparing, by the one or more processing devices, the intersection fingerprint with the one or more previously validated intersection templates;

based at least on comparing the intersection fingerprint with the one or more previously validated intersection templates, generating, by the one or more processing devices, a value that reflects an extent to which the particular candidate intersection is associated with the one or more previously validated intersection templates;

determining, by the one or more processing devices, that the value satisfies a threshold; and based on determining that the value satisfies the threshold, designating, by the one or more processing devices, the particular candidate intersection as validated.

15. The system of claim 14, wherein the one or more previously validated intersection templates comprises a fingerprint for an intersection that was designated as valid by performing one or more quality control processes of a quality assurance engine of the system.

16. The system of claim 10, wherein the topological structure of the plurality of lanes of the particular candidate intersection comprises a topological property of one or more lanes of the plurality of lanes that does not change under a distortion of geometry of the particular intersection.

17. The system of claim 16, wherein the topological property of the one or more lanes comprises at least one of a number of lanes, an arrangement of lanes, or a fan-out of a lane; and wherein the geometry of the plurality of lanes of the particular candidate intersection comprises at least one of a width of a lane, a distance between lanes, or an angle between lanes.

18. The system of claim 10, wherein the annotated intersection data comprises at least one of annotated image data of the particular candidate intersection or annotated radar data of the particular candidate intersection.

19. One or more computer-readable storage media storing a computer program, the computer program comprising instructions that when executed by one or more processing devices cause the one or more processing devices to perform operations comprising:

receiving, by the one or more processing devices, annotated intersection data representative of one or more attributes of each lane of a plurality of lanes of a particular candidate intersection;

processing, by the one or more processing devices, the annotated intersection data to generate an intersection fingerprint for the particular candidate intersection, the intersection fingerprint being representative of a topological structure of the plurality of lanes of the particular candidate intersection;

designating, by the one or more processing devices, the particular candidate intersection as validated based at least on comparing the intersection fingerprint for the particular candidate intersection with one or more previously validated intersection templates; and in response to designating the particular candidate intersection as validated, storing, by the one or more processing devices, a representation of the particular candidate intersection in a roadgraph for use by a vehicle navigation system.

20. The one or more computer-readable storage media of claim 19, wherein designating the particular candidate intersection as validated based at least on comparing the intersection fingerprint with the one or more previously validated intersection templates comprises:

accessing, by the one or more processing devices, the one or more previously validated intersection templates;

comparing, by the one or more processing devices, the intersection fingerprint with the one or more previously validated intersection templates;

based at least on comparing the intersection fingerprint with the one or more previously validated intersection templates, generating, by the one or more processing devices, a value that reflects an extent to which the particular candidate intersection is associated with the one or more previously validated intersection templates;

determining, by the one or more processing devices, that the value satisfies a threshold; and based on determining that the value satisfies the threshold, designating, by the one or more processing devices, the particular candidate intersection as validated.

\* \* \* \* \*

UNITED STATES PATENT AND TRADEMARK OFFICE
CERTIFICATE OF CORRECTION

| | |
|---|---|
| PATENT NO. | : 11,080,267 B2 |
| APPLICATION NO. | : 16/120071 |
| DATED | : August 3, 2021 |
| INVENTOR(S) | : Montemerlo |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 448 days.

Signed and Sealed this
Fourteenth Day of February, 2023

Katherine Kelly Vidal
*Director of the United States Patent and Trademark Office*